US010723345B2

(12) United States Patent
Glander et al.

(10) Patent No.: US 10,723,345 B2
(45) Date of Patent: Jul. 28, 2020

(54) HORIZON-STABILIZED LATERAL CONTROL FOR A VEHICLE

(71) Applicant: TRW Automotive GmbH, Alfdorf (DE)

(72) Inventors: Karl-Heinz Glander, Monheim (DE); Marco Wegener, Neuss (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 272 days.

(21) Appl. No.: 15/849,791

(22) Filed: Dec. 21, 2017

(65) Prior Publication Data
US 2018/0208183 A1    Jul. 26, 2018

(30) Foreign Application Priority Data

Jan. 20, 2017    (DE) .................. 10 2017 000 526

(51) Int. Cl.
*B60W 30/045*    (2012.01)
*B60W 40/072*    (2012.01)
(Continued)

(52) U.S. Cl.
CPC .......... *B60W 30/045* (2013.01); *B60W 10/20* (2013.01); *B60W 30/12* (2013.01);
(Continued)

(58) Field of Classification Search
CPC .... B60W 30/045; B60W 10/20; B60W 30/12; B60W 40/072; B60W 50/14
See application file for complete search history.

(56) References Cited

U.S. PATENT DOCUMENTS

| 5,485,378 A | 1/1996 | Franke et al. |
| 2016/0107640 A1 | 4/2016 | Takahashi et al. |
| 2018/0319424 A1* | 11/2018 | Giersiefer ............ B62D 5/0463 |

FOREIGN PATENT DOCUMENTS

DE    102007061900    6/2009

OTHER PUBLICATIONS

Quinlan et al. "Elastic Bands: Connectin path planning and control", 1993, Robotics and Automation, vol. 2, pp. 802-807.
(Continued)

*Primary Examiner* — Michael D Lang
(74) *Attorney, Agent, or Firm* — Tarolli, Sundheim, Covell & Tummino LLP

(57) ABSTRACT

Lateral control of a vehicle, based on surroundings sensor signals of a surroundings sensor system of a host vehicle and/or maps, combined with an instantaneous position determination, wherein the course of the instantaneously traveled roadway and the position of the host vehicle on the roadway are determined, based on the surroundings sensor signals and/or the position determination, autonomous steering interventions are made in the host vehicle, which as a result, approximate or correspond to actuations of a steering wheel of the host vehicle, or provide a driver with information concerning steering interventions, a horizon position on the instantaneously traveled roadway to which the host vehicle is to be oriented is repeatedly determined, in that, starting from an instantaneous position of the host motor vehicle, an inner tangent point situated ahead of the host vehicle on the instantaneously traveled roadway is determined, and, starting from a point on the host motor vehicle, a tangent through this inner tangent point to a point of intersection with a horizon point function is determined, and an angle is enclosed between the center longitudinal axis of the host vehicle and the tangent, and is used for determining an angle specification for the steering intervention.

16 Claims, 8 Drawing Sheets

(51) Int. Cl.
*B60W 30/12* (2020.01)
*B60W 50/14* (2020.01)
*B60W 10/20* (2006.01)

(52) U.S. Cl.
CPC .......... *B60W 40/072* (2013.01); *B60W 50/14* (2013.01); *B60W 2554/80* (2020.02); *B60W 2556/60* (2020.02); *B60W 2710/207* (2013.01)

(56) References Cited

OTHER PUBLICATIONS

Sattel et al. "Ground Vehicle Guidance along Collision-Free Trajectories using Elastic Bands", 2005. American Control Conference, vol. 7, pp. 4991-4996.
Alia et al "Local Trajectory Planning and Tracking of Autonomous Vehicles, Using Clothoid Tentacles Method", 2015, Intelligent Vehicle Suspension pp. 674-679.

\* cited by examiner

Fig. 6 Transition $$|r_{HP,CD}| = v \cdot t_{def.}$$
$$|r_{HP,SAD}| = v \cdot t_{def.}$$

Fig. 7 Straight-ahead travel ly traveled roadway, to which the host vehicle is to be oriented. For this purpose, the controller is configured for determining, starting from an instantaneous position of the host motor vehicle, an inner tangent point situated ahead of the host vehicle on the instantaneously traveled roadway, and determining, starting from a point on the host motor vehicle, a straight line through this inner tangent point to a point of intersection with a horizon point function. An angle enclosed between the center longitudinal axis of the host vehicle and the straight line is used for determining an angle specification for the steering intervention.

HORIZON-STABILIZED LATERAL CONTROL FOR A VEHICLE

RELATED APPLICATION

This application claims priority from German Application No. 10 2017 000 526.5, filed Jan. 20, 2017, the subject matter of which is incorporated herein by reference in its entirety.

BACKGROUND

A system for horizon-stabilized lateral control for a vehicle and a corresponding method are disclosed herein. This system and method are usable in particular in (partially) autonomously moving motor vehicles. However, in driver-steered motor vehicles as well, this lateral control of a vehicle may assist the driver in selecting the travel trajectory. Details in this regard are defined in the claims; in addition, the description and the drawings contain relevant information concerning the system and the operating principle, as well as variants of the system and the method.

PRIOR ART

In the field of autonomous robot control, for avoiding collisions the concept of using so-called elastic hands is known from Quinlan, S. and Khatib, O., "Elastic bands: connecting path planning and control" in Robotics and Automation, pp. 802-807, Vol. 2, 1993 and from Sattel, T. and Brandt, T., "Ground vehicle guidance along collision-free trajectories using elastic bands," American Control Conference, pp. 4991-4996, Vol. 7, 2005. These elastic bands result in a collision-free path which, when traversed, deforms under the influence of artificial forces due to obstacles in the surroundings of the path which change or shift over time.

It is known from Alia, C., Gilles, T, and Ali, C., "Local trajectory planning and tracking of autonomous vehicles, using clothoid tentacles method" in intelligent Vehicles Symposium, pp. 674-679, 2015, to determine clothoid tentacles, starting from the host vehicle, which indicate traversable trajectories, wherein an occupancy grid indicates individual clothoid tentacles as collision-free, traversable trajectories.

Underlying Problem

Although the above-mentioned concepts provide usable results, they are very computation-intensive. Use in mass-produced motor vehicles would thus require relatively powerful, and therefore costly, computers. This situation is exacerbated by the fact that for speeds at which motor vehicles typically travel, the results must be available much more quickly than for relatively slow-moving robots.

Proposed Solution

A system/a method for horizon-stabilized lateral control of a vehicle, based on a surroundings sensor system of the host vehicle and/or (topographic/road) maps, combined with an instantaneous position determination for the host vehicle. The surroundings sensor system of the host vehicle may be based on radar, lidar, camera, ultrasound, or the like, and/or on map material, which may be combined with an instantaneous position determination for the host vehicle. For example, a satellite-based navigation device may provide this position determination. The surroundings sensor system and/or the position determination may be configured for determining the course of the instantaneously traveled roadway as well as the position of the host vehicle on the roadway. A steering angle intervention device is configured for making autonomous driving operation interventions in the host vehicle, which as a result, approximate or correspond to actuations of a steering wheel of the host vehicle or provide a driver with information concerning steering interventions. A controller is provided, and is configured for repeatedly determining a horizon position, on the instantaneous This angle specification for the steering intervention may be selectively specified for the driver by haptic, optical, acoustical, etc., means, so that the driver appropriately actuates the steering wheel. Alternatively, the angle specification for the steering intervention is supplied to an actuator, which acts on the steering via gearing.

Further Embodiments and Advantageous Refinements

In one variant, the control system is configured and intended for determining the inner tangent point situated on the instantaneously traveled roadway, taking into account a lateral edge of the roadway, a safety distance to be established from this edge of the roadway, and/or a (one-half) vehicle width of the host vehicle.

In one variant, the control system is configured and intended for determining, in a segment of the roadway situated ahead of the host vehicle having a curve, the inner tangent point situated on the instantaneously traveled roadway as the point of a safety distance function, which is a tow-order polynomial, for example a first- to fourth-order, preferably third-order, polynomial.

In one variant, the control system is configured and intended for determining, in a segment of the roadway situated ahead of the host vehicle having a curve, the horizon point function as a low-order polynomial, for example a first- to fourth-order, preferably third-order, polynomial, and/or for determining, in a segment of the roadway situated ahead of the host vehicle having a straight course, the horizon point function as a straight line segment that is to be reached by the host vehicle within a predetermined time period. In one variant, the horizon point function and the safety distance function differ only in their lateral offset.

In one variant, the control system is configured and intended for determining, starting from a course of the lateral edge of the roadway that is ascertained with the surroundings sensor system of the host vehicle and/or maps, combined with an instantaneous position determination for the host vehicle, the polynomial or the straight line segment of the horizon point function, for example by approximation.

In one variant, the control system is configured and intended for determining the horizon point function, taking into account a safety distance and/or a predetermined lateral distance of the host vehicle from the lateral edge of the roadway.

In one variant, the control system is configured and intended for switching between a determination of the polynomial and the determination of the straight line segment, as a function of an instantaneous position of the host vehicle and the course of the roadway.

In one variant, the control system is configured and intended for determining the safety distance function and/or the horizon point function, for example by approximation, taking into account a low-order polynomial, for example a first- to fourth-order, preferably third-order, polynomial, that describes the course of the lateral edge of the roadway, and taking into account a safety distance to be established from this edge of the roadway, a one-half vehicle width of the host vehicle, and/or a predetermined lateral distance of the host vehicle from the lateral edge of the roadway.

In one variant, the control system is configured and intended for determining, taking into account a differentiation/derivation of the safety distance function according to a location variable, the tangent between the point on the host vehicle and the inner tangent point, and the angle between the center longitudinal axis of the host vehicle and the tangent.

BRIEF DESCRIPTION OF THE DRAWINGS

Further aims, features, advantages, and possible applications result from the following description of exemplary embodiments, which are not to be construed as limiting, with reference to the associated drawings. All features described and/or graphically illustrated, alone or in any combination, constitute the subject matter disclosed herein, also independently of their grouping in the claims or their back-references. The dimensions and proportions of the components shown in the figures are not necessarily to scale, and in the embodiments to be implemented may differ from those illustrated herein.

DETAILED DESCRIPTION OF THE DRAWINGS

Figure 1:
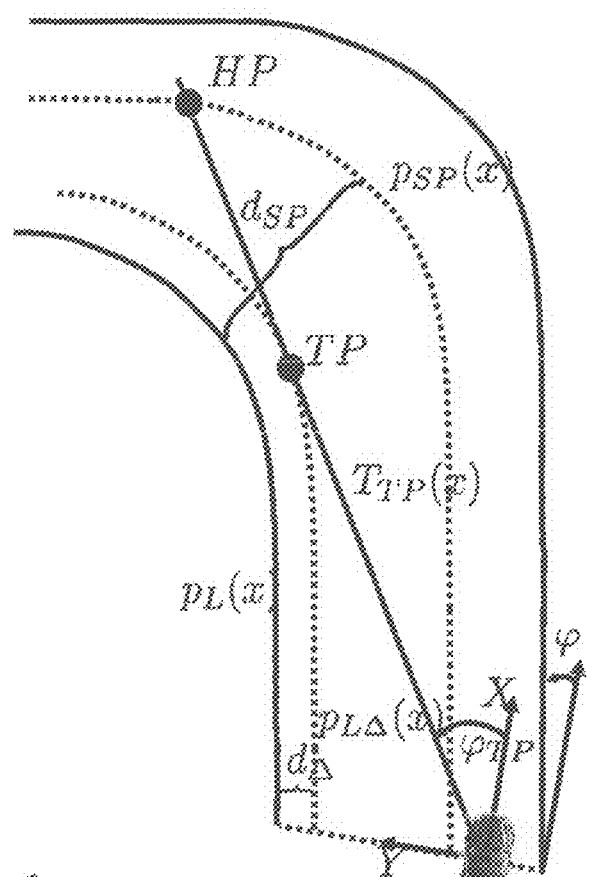
FIG. 1 schematically shows a first driving situation in which a host motor vehicle is traveling on a lane in a left curve.

FIG. 1 schematically shows a driving situation in which a host (motor) vehicle is traveling into a roadway segment in a (left) curve. A control system with the associated vehicle is used for horizon-stabilized lateral control of the vehicle. This control system accesses a surroundings sensor system of the host vehicle and roadway maps, combined with an instantaneous position determination from a satellite-based navigation system, for example. In one variant, the surroundings sensor system includes radar sensors and (infrared and daylight) cameras, not depicted in greater detail here, with which the surroundings situation to the front and the side of the vehicle is detected and evaluated. By use of this surroundings sensor system and the position determination, the course of the instantaneously traveled roadway as well as the position of the host vehicle on the roadway are determined and continuously provided to the control system. The control system includes a steering angle intervention device, not depicted in greater detail, which has a computer, program/data memory, input/output devices, etc. This steering angle intervention device is coupled to corresponding actuators, not depicted in greater detail, in the vehicle, and configured for making autonomous steering interventions in the host vehicle corresponding to actuations of a steering wheel of the host vehicle. A controller, explained in greater detail below, is provided in the control system and configured for continuously, repeatedly determining a horizon position HP on the instantaneously traveled roadway on which the host vehicle is to be oriented. Starting from an instantaneous position P0 of the host vehicle, an inner tangent point TP situated ahead of the host vehicle on the instantaneously traveled roadway is determined. Starting from a point, in the present case at the front and center of the host vehicle, a tangent TTP(x) through this tangent point TP to a point of intersection HPCD with a horizon point function pSP(x) is determined.

An angle PHITP is enclosed between the center longitudinal axis of the host vehicle and the tangent TTP(x). This angle PHITP is used for determining an angle specification for the steering intervention in the control system.

Figure 2:
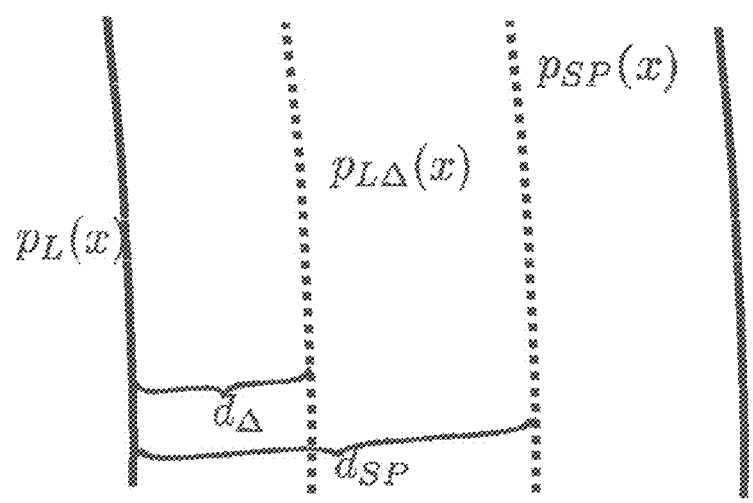
FIG. 2 schematically shows the lane from FIG. 1 in an enlarged view, with further details used in computing the cornering.
Figure 3:
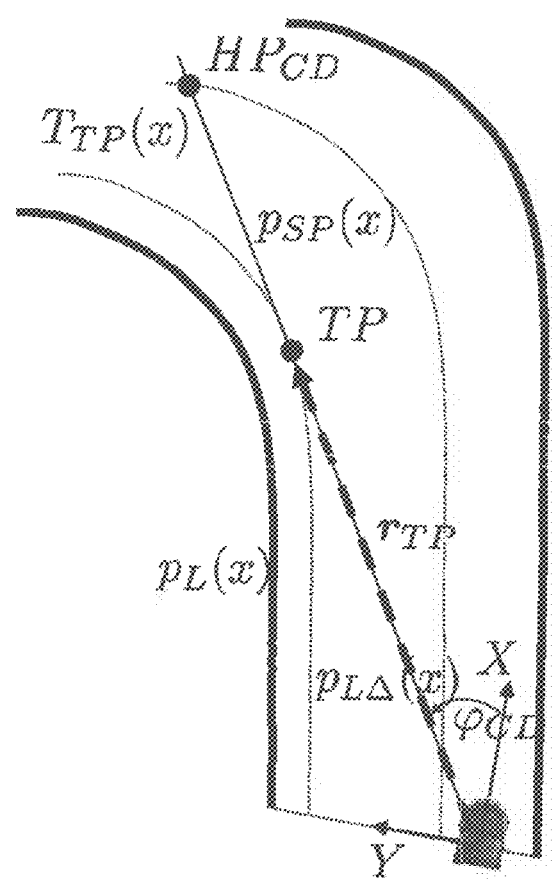
FIG. 3 schematically shows the lane from FIG. 1, with further details used for computing the cornering.

In particular, it is explained in FIGS. 2 and 3 how a safety distance function pLDELTA(x) and a horizon point function pSP(x) are to be determined for a curved course of the roadway. A course of the lateral edge of the roadway (from the surroundings sensor system of the host vehicle and the roadway maps, combined with an instantaneous position determination), a roadway-based safety distance DSMDEF, a control-based safety distance dSMCTRL, and a one-half vehicle width DHVW are used as input variables.

A distance dDelta for ascertaining the safety distance function pLDELTA(x) in the form of a polynomial is determined as the sum of the roadway-based safety distance dSMDEF, the control-based safety distance dSMCTRL, and the one-half vehicle width dHVW:

$$d_{Delta}:=d_{SM,def}+d_{SM,CTRL}+d_{HVW}$$

Based on the distance dDelta, the safety distance function pLDELTA(x) is determined in the form of a third-order polynomial having the coefficients b0 to b3:

$$pL_{DELTA}(x)=f(pL(x),d_{DELTA})=b_3x^3+b_2x^2+b_1x+b_0$$

The horizon point function pSP(x) in the form of a third-order polynomial having the coefficients a0 to a3 is determined in the lateral distance dSP from the left lateral edge of the roadway to the opposite (right) lateral edge of the roadway:

$$p_{SP}(x)=f(pL)x)d_{SP})=a_3x^3+a_2x^2+a_1x+a0$$

Based on the safety distance function pLDELTA(x)

$$p_{LDELTA}(x)=b_3x^3+b_2x^2+b_1x+b_0,$$

the angle PHITP is determined as follows: First the safety distance function $p_{LDELTA}(x)$ is derived according to the location variable x:

$$dp_{LDELTA}(x)/dx=3b_3x^2+2b_2x+b_1$$

The tangent $T_{TP}(x)$ has the following equation:

$$T_{TP}(x)=p_{LDELTA}(x_{TP})+dp_{LDELTA}(x_{TP})/dx*(x-x_{TP})$$

To determine the tangent that connects the origin P0 in the vehicle and the inner tangent point TP situated on the instantaneously traveled roadway, the zero points of the tangent equation must be determined. For this purpose, the zero points of the cubic equation $$-2b_3x^3TP - b_2x^2TP + b_0 = 0$$

are determined. From this value, the tangent vector gammaTP may be determined as $$\text{gamma}_{TP} = (X_{TP}, y_{TP} = T_{TP(XTP)}),$$

and the angle PHITP determined as $$PHITP = \arctan(y_{TP}/X_{TP}).$$

Based on the safety distance function pLDELTA(x)

$$P_{LDELTA}(x) = b_3x^3 + b_2x^2 + b_1x + b_0$$

and the tangent $T_{TP}(x)$ $$T_{TP}(x) = dp_{LDELTA}(x_{TP})/dx * x,$$

the equation of the tangent TTP(x) through this tangent point TP to the point of intersection HPCD $$a_3x^3HP_{CD} + a_2x^2HP_{CD} + (a_1 - dp_{LDELTA}(xTP)/dx))* xHP_{CD}a_0 = 0$$

is solved, which gives the horizon point vector gammaHPCD as $$\text{gamma}HP_{CD} = (XHP_{CD}, yHP_{CD} = T_{TP}(xHP_{CD})).$$

The equation gives two solutions: namely, the vehicle prior to a left curve is situated to the right of the tangent point polynomial, or prior to a right curve is situated to the left of the tangent point polynomial. In this case, the point of intersection farther from the vehicle is used as the horizon point.

Figure 4:
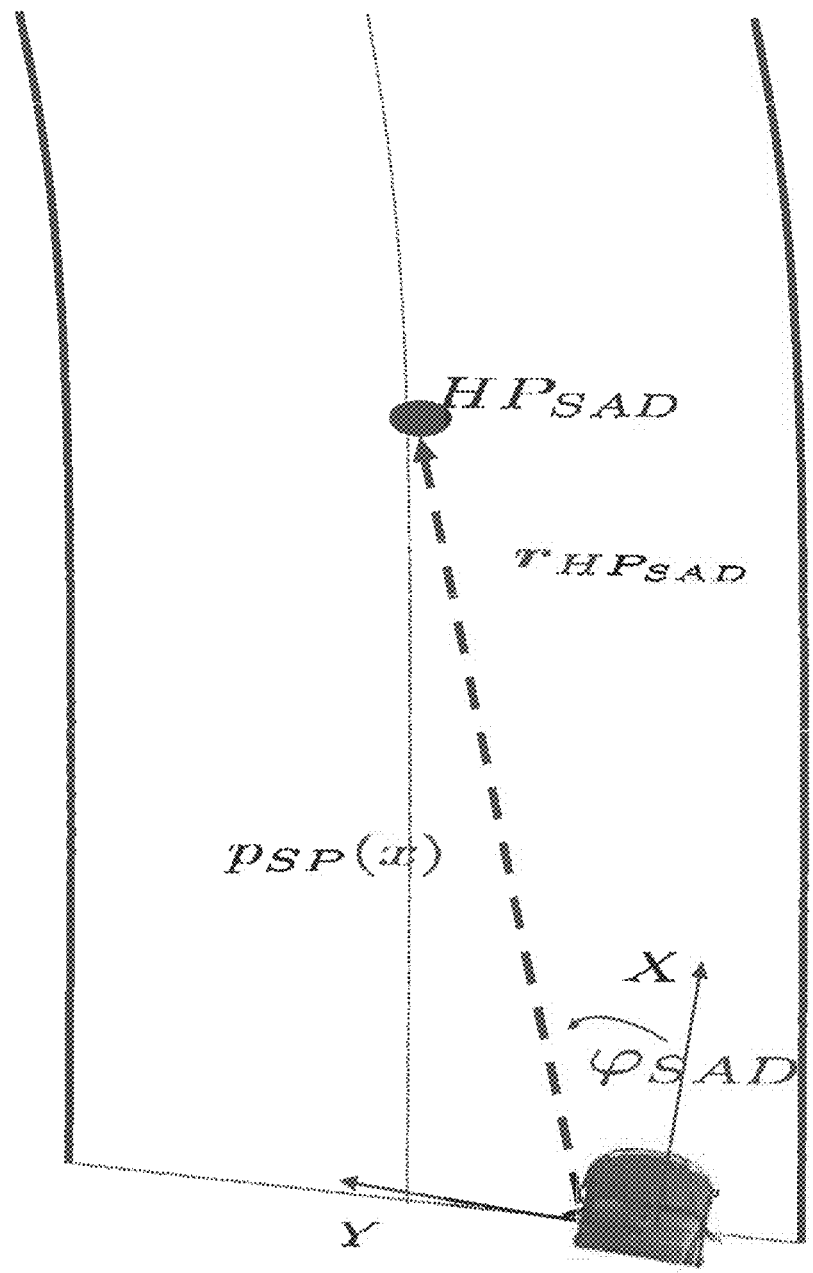
FIG. 4 schematically shows a lane with details used for computing the straight-ahead travel.
Figure 5:
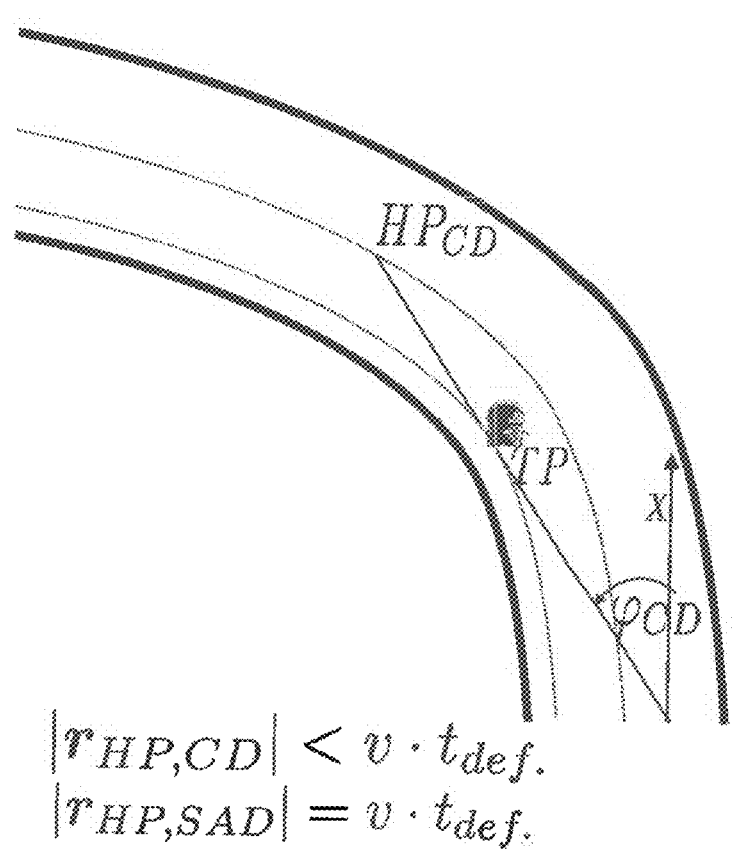
FIGS. 5 through 7 schematically show the conditions for the transition from cornering to straight-ahead travel.

For roadway segments running in a straight line (see FIG. 4), based on the horizon point function pSP(x)

$$p_{SP}(x)f(pL(x), d_{SP}) = a_3x^3 + a_2x^2 + a_1x + a_0$$

and a settable time period tdef that implicitly sets the time defining the lateral speed, the following equation is solved:

$$abs(\text{gamma}HP_{SAD}) = abs((XHP_{SAD}, yHP_{SAD}) = v*tdef,$$

where HPSAD is the point on the horizon point function pSP(x) that is to be reached within the time period tdef by the vehicle having speed v.

On this basis, the tangent vector gammaTP may be determined as $$\text{gamma}HP_{SAD} = (XHP_{SAD}, PSPHP_{SAD}),$$

and the angle PHISAD may be determined as $$PHI_{SAD} = \arctan(YHP_{SAD}/XHP_{SAD})$$

for the straight-ahead travel of the vehicle.

Figure 6:
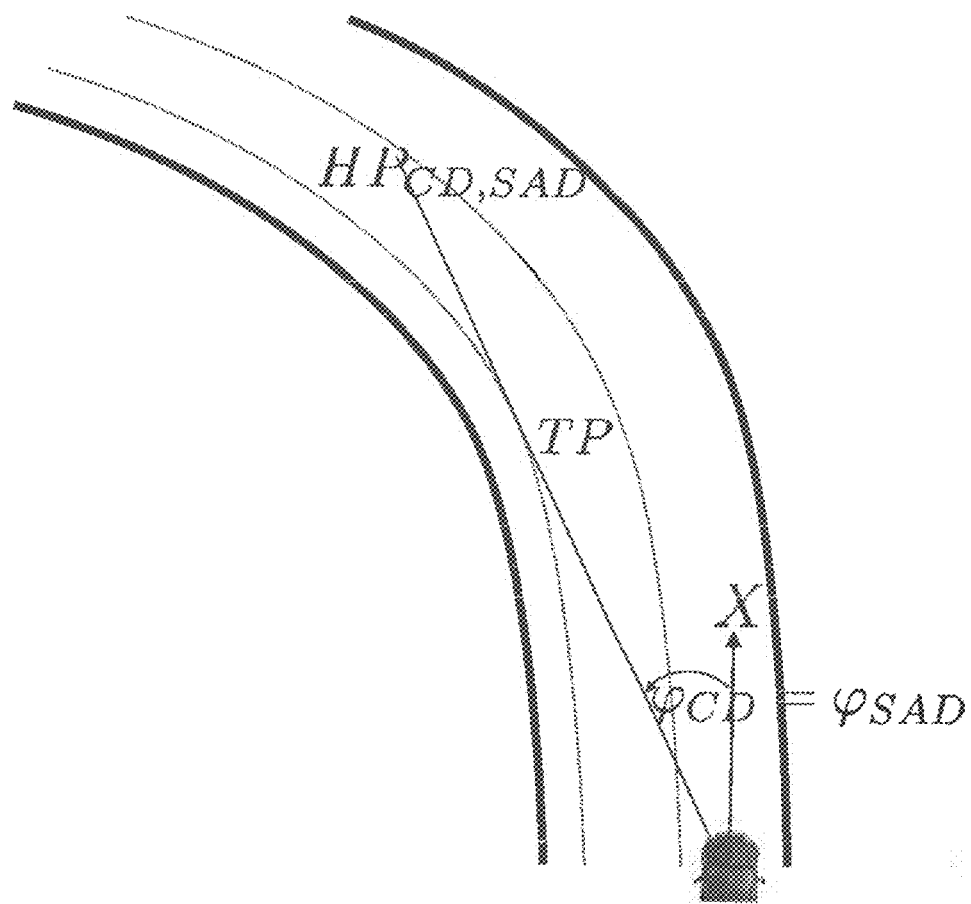
Figure 7:
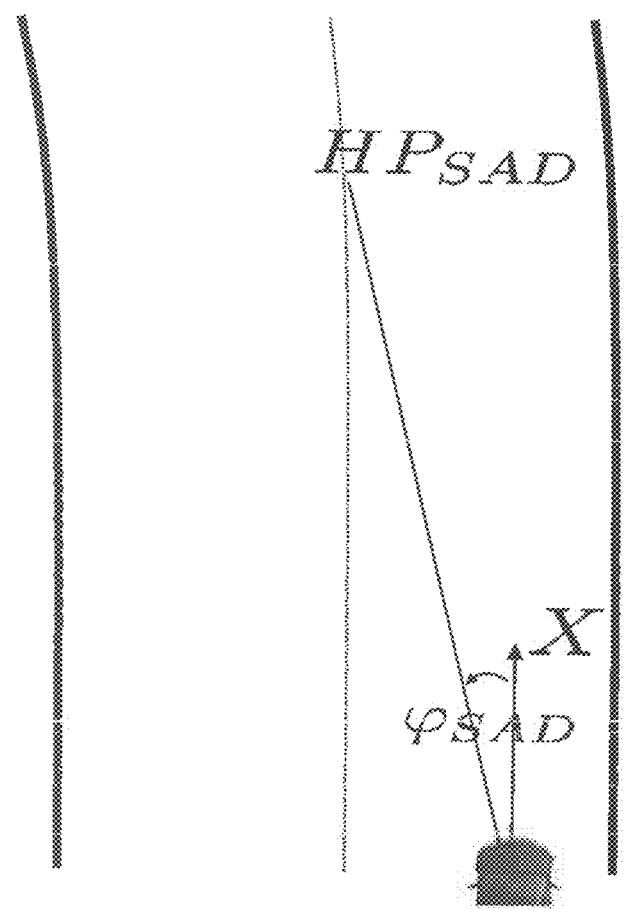

The conditions for the transition from cornering into straight-ahead travel are explained in FIGS. 6 through 7.

Provided that the condition $$abs(\text{gamma}HP_{CD}) < v*tdef,$$

based on the horizontal position that was determined by the cornering algorithm (see FIGS. 1 through 3) is met, the corresponding angle PHICD is used as the default for the steering angle control:

$$PHI_S := PHI_{CD}$$

The surroundings sensor system recognizes the decrease in the curvature of the curve during the continuous observation thereof. At a point in time, the distance v*tdef will be equal to the computed horizon position. Beginning at this point in time, the angle specification gammaHPSAD pointing toward the horizon position for straight-ahead travel is used as the default for the steering angle control:

$$PHI_S := PHI_{SAD}$$

Since the computed angles PHICD and PHISAD, as the default for the steering angle control during the transition from cornering into straight-ahead travel are equal by definition, the resulting angle specification is also a continuously changing value.

Figure 8:
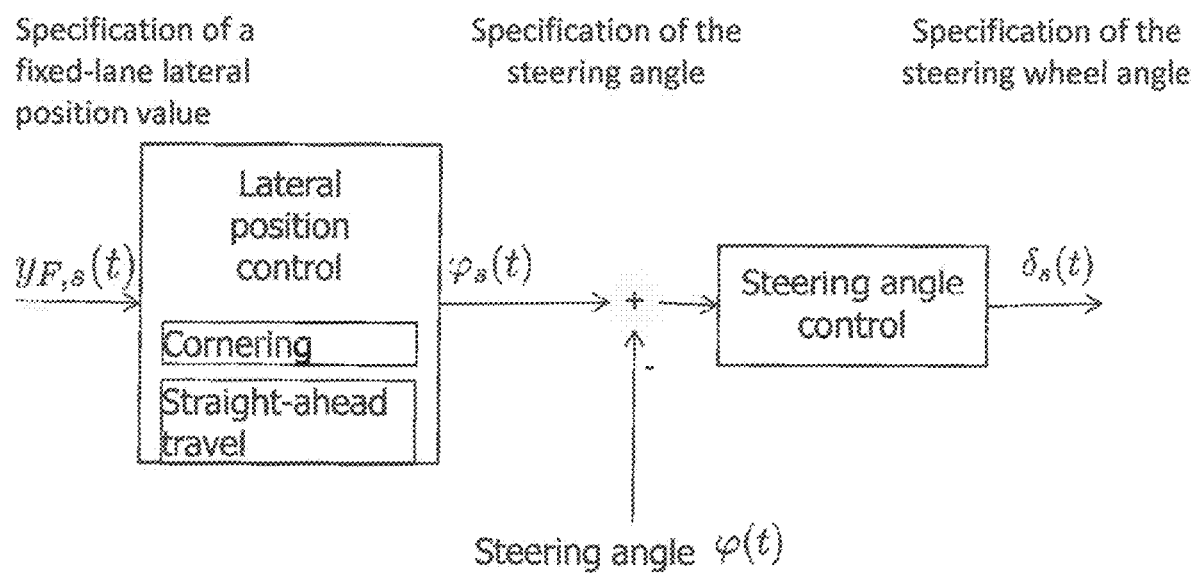
FIG. 8 schematically shows a controller for implementing the cornering and straight-ahead travel.

FIG. 8 depicts a controller for achieving the cornering and straight-ahead travel according to the above implementation.

The variants described above as well as their design and operational aspects are used solely for better understanding of the structure, the operating principle, and the properties; they do not limit the disclosure to the exemplary embodiments, for example. The figures are sometimes schematic, and important properties and effects are sometimes illustrated in much larger scale, in order to clarify the functions, functional principles, technical embodiments, and features. Any operating principle, any principle, any technical embodiment, and any feature that is disclosed in the figures or in the text, together with all claims, may be freely and arbitrarily combined with any feature in the text and with the other figures, other operating principles, principles, technical embodiments, and features that are contained in the present disclosure or result therefrom, so that all conceivable combinations of the described variants are to be assigned. Also encompassed are combinations between all individual statements in the text, i.e., in any section of the description, in the claims, as well as combinations between various variants in the text, in the claims, and in the figures. Furthermore, the claims do not limit the disclosure, or thus, the combination options of all disclosed features with one another. All disclosed features are also explicitly disclosed herein, individually and in combination with ail other features.

The invention claimed is:

1. A control system for horizon-stabilized lateral control of a vehicle, based on a surroundings sensor system of a host vehicle and/or maps, combined with an instantaneous position determination, wherein
   the surroundings sensor system and/or the position determination are/is configured for determining the course of an instantaneously traveled roadway as well as the position of the host vehicle on the roadway,
   a steering angle intervention device is configured for making autonomous steering interventions in the host vehicle, which as a result, approximate or correspond to actuations of a steering wheel of the host vehicle or provide a driver with information concerning steering interventions, and
   a controller is provided, and is configured for
   determining an inner tangent point (TP) situated ahead of the host vehicle on the instantaneously traveled roadway, taking into account a lateral edge of the roadway, a safety distance (DDELTA) to be established from this edge of the roadway, and/or a one-half vehicle width (DHVW) of the host vehicle,
   repeatedly determining a horizon position, on the instantaneously traveled roadway, to which the host vehicle is to be oriented, in that, starting from a point on the host motor vehicle, a tangent (TTP(x)) through the inner tangent point (TP) to a point of intersection with a horizon point function (pSP(x)) is determined, and
   an angle (PHITP) is enclosed between the center longitudinal axis of the host vehicle and the tangent (TTP (x)), and is used for determining an angle specification for the steering intervention.

2. The control system according to claim 1, which is configured and intended for determining, in a segment of the roadway situated ahead of the host vehicle having a curve, the inner tangent point (TP) situated on the instantaneously traveled roadway as the point of a safety distance function (pLDELTA(x)), which is a low-order polynomial.

3. The control system according to claim 1, which is configured and intended
for determining, in a segment of the roadway situated ahead of the host vehicle having a curve, the horizon point function as a low-order polynomial, and/or
for determining, in a segment of the roadway situated ahead of the host vehicle having a straight course, the horizon point function (pSP(x)) as a straight line segment that is to be reached by the host vehicle within a predetermined time period.

4. The control system according to claim 1, which is configured and intended
for determining, starting from a course of the lateral edge of the roadway that is ascertained with the surroundings sensor system of the host vehicle and/or maps, combined with an instantaneous position determination for the host vehicle, the polynomial or the straight line segment of horizon point function (pSP(x)).

5. The control system according claim 1, which is configured and intended for determining the horizon point function (pSP(x)), taking into account a safety distance and/or a predetermined lateral distance of the host vehicle from the lateral edge of the roadway.

6. The control system according to claim 1, which is configured and intended for switching between a determination of the polynomial and the determination of the straight line segment, as a function of an instantaneous position of the host vehicle and the course of the roadway.

7. The control system according to claim 1, which is configured and intended for determining, taking into account (i) a low-order polynomial that describes the course of the lateral edge of the roadway, (ii) a safety distance to be established from this edge of the roadway, (iii) a one-half vehicle width of the host vehicle, and/or (iv) a predetermined lateral distance of the host vehicle from the lateral edge of the roadway,
a safety distance function (pLDELTA(x)) and/or
the horizon point function (pSP(x)).

8. The control system according to claim 1, which is configured and intended for determining, taking into account a differentiation of a safety distance function (pLDELTA(x)) according to a location variable (x), the tangent (TTP(x)) between the point on the host vehicle and the inner tangent point (TP), and the angle (PHITP) between the center longitudinal axis of the host vehicle and the tangent (TTP(x)).

9. A control system for horizon-stabilized lateral control of a vehicle, based on a surroundings sensor system of a host vehicle and/or maps, combined with an instantaneous position determination, wherein
the surroundings sensor system and/or the position determination are/is configured for determining the course of an instantaneously traveled roadway as well as the position of the host vehicle on the roadway,
a steering angle intervention device is configured for making autonomous steering interventions in the host vehicle, which as a result, approximate or correspond to actuations of a steering wheel of the host vehicle or provide a driver with information concerning steering interventions, and
a controller is provided, and is configured for
determining, starting from a course of a lateral edge of the roadway that is ascertained with the surroundings sensor system of the host vehicle and/or the maps, combined with the instantaneous position determination for the host vehicle, a polynomial or a straight line segment of horizon point function (pSP(x)),
repeatedly determining a horizon position, on the instantaneously traveled roadway, to which the host vehicle is to be oriented, in that, starting from an instantaneous position of the host motor vehicle, an inner tangent point (TP) situated ahead of the host vehicle on the instantaneously traveled roadway is determined, and, starting from a point on the host motor vehicle, a tangent (TTP(x)) through the inner tangent point (TP) to a point of intersection with the horizon point function (pSP(x)) is determined, and
an angle (PHITP) is enclosed between the center longitudinal axis of the host vehicle and the tangent (TTP(x)), and is used for determining an angle specification for the steering intervention.

10. The control system according to claim 9, which is configured and intended for determining the inner tangent point (TP) situated on the instantaneously traveled roadway, taking into account a lateral edge of the roadway, a safety distance (DDELTA) to be established from this edge of the roadway, and/or a one-half vehicle width (DHVW) of the host vehicle.

11. The control system according to claim 10, which is configured and intended for determining, in a segment of the roadway situated ahead of the host vehicle having a curve, the inner tangent point (TP) situated on the instantaneously traveled roadway as the point of a safety distance function (pLDELTA(x)), which is a low-order polynomial.

12. The control system according to claim 9, which is configured and intended
for determining, in a segment of the roadway situated ahead of the host vehicle having a curve, the horizon point function as a low-order polynomial, and/or
for determining, in a segment of the roadway situated ahead of the host vehicle having a straight course, the horizon point function (pSP(x)) as a straight line segment that is to be reached by the host vehicle within a predetermined time period.

13. The control system according claim 9, which is configured and intended for determining the horizon point function (pSP(x)), taking into account a safety distance and/or a predetermined lateral distance of the host vehicle from the lateral edge of the roadway.

14. The control system according to claim 9, which is configured and intended for switching between a determination of the polynomial and the determination of the straight line segment, as a function of an instantaneous position of the host vehicle and the course of the roadway.

15. The control system according to claim 9, which is configured and intended for determining, taking into account (i) a low-order polynomial that describes the course of the lateral edge of the roadway, (ii) a safety distance to be established from this edge of the roadway, (iii) a one-half vehicle width of the host vehicle, and/or (iv) a predetermined lateral distance of the host vehicle from the lateral edge of the roadway,
a safety distance function (pLDELTA(x)) and/or
the horizon point function (pSP(x)).

16. The control system according to claim 9, which is configured and intended for determining, taking into account a differentiation of a safety distance function (pLDELTA(x)) according to a location variable (x), the tangent (TTP(x)) between the point on the host vehicle and the inner tangent point (TP), and the angle (PHITP) between the center longitudinal axis of the host vehicle and the tangent (TTP(x)).

\* \* \* \* \*